(12) United States Patent
Reynolds

(10) Patent No.: US 8,236,170 B2
(45) Date of Patent: Aug. 7, 2012

(54) REACTOR FOR USE IN UPGRADING HEAVY OIL

(75) Inventor: Bruce Reynolds, Martinez, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 698 days.

(21) Appl. No.: 12/355,574

(22) Filed: Jan. 16, 2009

(65) Prior Publication Data

US 2009/0134064 A1    May 28, 2009

Related U.S. Application Data

(63) Continuation-in-part of application No. 11/305,359, filed on Dec. 16, 2005, now abandoned, and a continuation-in-part of application No. 12/212,737, filed on Sep. 18, 2008, now Pat. No. 7,931,796.

(51) Int. Cl.
*C10G 47/26* (2006.01)
*B01J 8/10* (2006.01)

(52) U.S. Cl. ........................ 208/108; 422/215

(58) Field of Classification Search .................. 208/108, 208/109, 112; 422/213–215
See application file for complete search history.

(56) References Cited

U.S. PATENT DOCUMENTS

| | | | |
|---|---|---|---|
| 4,221,653 A | 9/1980 | Chervenak et al. | |
| 4,571,326 A | 2/1986 | Bischoff et al. | |
| 4,615,870 A | 10/1986 | Armstrong et al. | |
| 4,684,456 A | 8/1987 | Van Driesen et al. | |
| 4,968,409 A | 11/1990 | Smith | |
| 5,723,041 A | 3/1998 | Devanathan et al. | |
| 6,270,654 B1 * | 8/2001 | Colyar et al. | 208/57 |
| 6,278,034 B1 | 8/2001 | Espinoza et al. | |
| 6,454,932 B1 | 9/2002 | Baldassari et al. | |
| 6,660,157 B2 | 12/2003 | Que et al. | |
| 6,726,832 B1 | 4/2004 | Baldassari et al. | |

* cited by examiner

*Primary Examiner* — Walter D Griffin
*Assistant Examiner* — Renee E Robinson

(57) ABSTRACT

The instant invention relates to an upflow for upgrading heavy oil feed stock and a method for upgrading heavy oil feed stock employing an upflow reactor and with a slurry catalyst. In one embodiment, the upflow reactor is a liquid recirculating reactor, which is operated in manner corresponding to a dispersed bubble flow regime, which requires a high liquid to gas ratio. A dispersed bubble flow regime results in more even flow patterns, increasing the amount of liquid, i.e., heavy oil feed stock that can be upgraded in a single reactor.

16 Claims, 2 Drawing Sheets

REACTOR FOR USE IN UPGRADING HEAVY OIL

CROSS-REFERENCE TO RELATED APPLICATIONS

This application is a continuation-in-part of U.S. patent application Ser. No. 11/305,359 having a filing date of Dec. 16, 2005 and U.S. patent application Ser. No. 12/212,737 having a filing date of Sep. 18, 2008. This application claims priority to and benefits from the foregoing; the disclosure of which are incorporated herein by reference.

FIELD OF THE INVENTION

The instant invention relates to methods for upgrading heavy oils admixed with a catalyst composition in a slurry using a liquid circulating reactor.

BACKGROUND OF THE INVENTION

Conventional heavy oil upgrading via hydroprocessing uses relatively inefficient large extrudate catalyst pellets to support the reactions. It has long been recognized that there are significant advantages to using a finely divided slurry catalyst for heavy oil upgrading via hydroprocessing. Past attempts to demonstrate slurry heavy oil hydroprocessing on a large scale have relied on upflow reactors employing bubble column technology. However, such reactors suffer from difficulty in maintaining the desired dispersed bubble flow regime necessary for efficient reactor volume utilization. Past problems with bubble column reactors and difficulties in maintaining the desired bubble flow regime has hindered the development of slurry heavy oil upgrading via hydroprocessing.

In heavy oil hydroprocessing in the prior art, upflow reactors have been used. U.S. Pat. No. 6,278,034 discloses a process in which a reactor contains a slurry bed, and feed is added at the bottom of the reactor. U.S. Pat. Nos. 6,454,932 and 6,726,832 disclose hydrocracking of heavy hydrocarbons in upflow reactors containing ebullating catalyst beds in series. U.S. Pat. No. 4,684,456 discloses an upflow reactor employing an expanded catalyst bed. The expansion of the bed is automatically controlled by automatically changing the rate of speed of a recycle pump for the reactor. There is no teaching in this patent of the use of such a reactor with a slurry.

U.S. Pat. No. 6,660,157 discloses a process for slurry hydrocracking employing a series of upflow reactors with interstage separation. The reactors are not liquid recirculating reactors, such as those employed in the instant invention.

In one embodiment, the invention relates to a novel use for a liquid recirculating reactor in upgrading heavy oils, particularly the upgrade of heavy oils employing an active catalyst composition in a slurry form, as admixed with heavy oil feedstock. In another embodiment, the invention relates to a method to upgrade heavy oils employing a liquid recirculating reactor, which does not employ any slurry bed, and where a slurry catalyst and feed mixture is added at the bottom of the reactor.

SUMMARY OF THE INVENTION

In one aspect, the invention relates to a reactor useful in upgrading heavy oils admixed with a catalyst composition in a slurry. The liquid recirculating reactor of this invention employs a dispersed bubble flow regime, which requires a high liquid to gas ratio. A dispersed bubble flow regime results in more even flow patterns, increasing the amount of liquid that can be upgraded in a single reactor.

In another aspect, the invention relates to a method for upgrading heavy oils admixed with a catalyst composition in a slurry, wherein a liquid recirculating reactor of this invention employs a dispersed bubble flow regime is employed, requiring a high liquid to gas ratio.

DETAILED DESCRIPTION OF THE INVENTION

Figure 1:
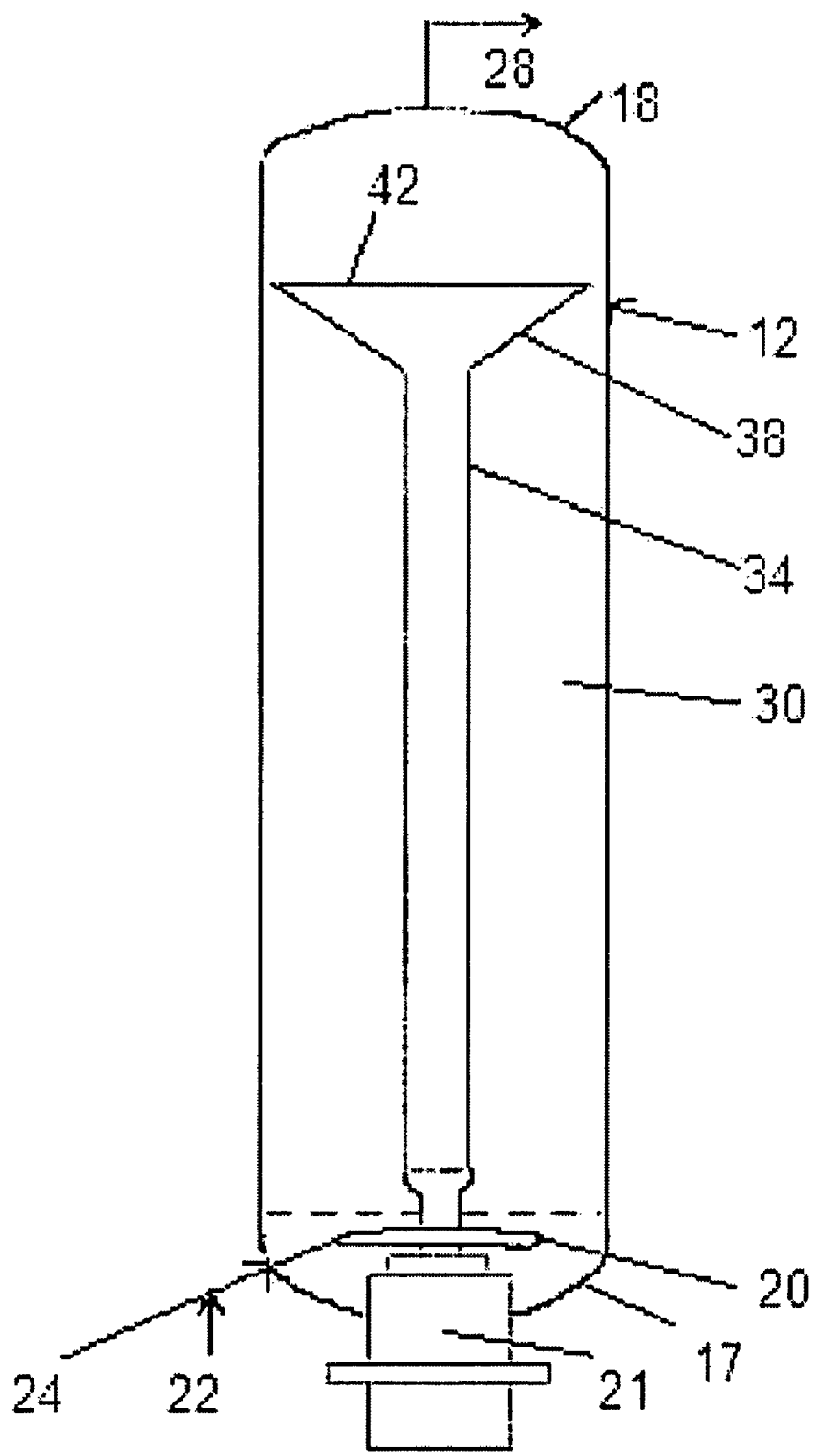
FIG. 1 is a schematic of an embodiment of a liquid recirculating reactor.

The conventional approach to slurry heavy oil hydroprocessing has been to rely only on the incoming liquid and gas flow to get the desired catalyst motion (called a slurry bubble column). However, a slurry bubble column is limited in its ability to tolerate the large volumes of hydrogen rich gas required for the upgrading. Slurry bubble columns tend to suffer due to bubble coalescence (the formation of large gas bubbles from smaller bubbles). Bubble coalescence creates highly uneven flow patterns in the reactor that significantly reduce performance. The amount of liquid that can be upgraded in a single reactor is limited. The uneconomic use of multiple reactors in parallel is required. In contrast, liquid recirculating reactors are able to handle higher gas rates (and therefore higher fresh liquid feed rates) than conventional slurry bubble columns, while maintaining dispersed bubble flow. This is due to the beneficial effect that oil to gas ratio (fresh feed plus recirculated liquid) has on the flow regime. The importance of this effect has not previously been appreciated.

In one embodiment, a liquid recirculating reactor is employed for the upgrade of heavy oil feed stock wherein a slurry catalyst is used. The heavy oil feed stock is fed into the liquid recirculating reactor along with a slurry catalyst feed in the presence of hydrogen.

As used herein, "heavy oil" refers to heavy and ultra-heavy crudes, including but not limited to resids, coals, bitumen, tar sands, etc. Heavy oil feedstock may be liquid, semi-solid, and/or solid. Examples of heavy oil feedstock that might be upgraded as described herein include but are not limited to Canada Tar sands, vacuum resid from Brazilian Santos and Campos basins, Egyptian Gulf of Suez, Chad, Venezuelan Zulia, Malaysia, and Indonesia Sumatra. Other examples of heavy oil feedstock include bottom of the barrel and residuum left over from refinery processes, including "bottom of the barrel" and "residuum" (or "resid")—atmospheric tower bottoms, which have a boiling point of at least 343° C. (650° F.), or vacuum tower bottoms, which have a boiling point of at least 524° C. (975° F.), or "resid pitch" and "vacuum residue"—which have a boiling point of 524° C. (975° F.) or greater. Properties of heavy oil feedstock may include, but are hot limited to: TAN of at least 0.1, at least 0.3, or at least 1; viscosity of at least 10 cSt; API gravity at most 20 in one embodiment, and at most 10 in another embodiment, and less than 5 in another embodiment. A gram of heavy oil feedstock typically contains at least 0.0001 grams of Ni/V/Fe; at least 0.005 grams of heteroatoms; at least 0.01 grams of residue; at least 0.04 grams C5 asphaltenes; at least 0.002 grams of MCR; per gram of crude; at least 0.00001 grams of alkali metal salts of one or more organic acids; and at least 0.005 grams of sulfur. In one embodiment, the heavy oil feedstock has a sulfur content of at least 5 wt. % and an API gravity of from −5 to +5. A heavy oil feed comprises Athabasca bitumen (Canada) typically has at least 50% by volume vacuum reside. A Boscan (Venezuela) heavy oil feed may contain at least 64% by volume vacuum residue.

As used herein, the terms "treatment," "treated," "upgrade", "upgrading" and "upgraded", when used in conjunction with a heavy oil feedstock, describes a heavy oil feedstock that is or has been subjected to hydroprocessing, or a resulting material or crude product, having a reduction in the molecular weight of the heavy oil feedstock, a reduction in the boiling point range of the feedstock, a reduction in the concentration of asphaltenes, a reduction in the concentration of hydrocarbon free radicals, and/or a reduction in the quantity of impurities, such as sulfur, nitrogen, oxygen, halides, and metals.

The upgrade or treatment of heavy oil feeds can be generally referred herein as "hydroprocessing." Hydroprocessing is meant any process that is carried out in the presence of hydrogen, including, but not limited to, hydroconversion, hydrocracking, hydrogenation, hydrotreating, hydrodesulfurization, hydrodenitrogenation, hydrodemetallation, hydrodearomatization, hydroisomerization, hydrodewaxing and hydrocracking including selective hydrocracking. The products of hydroprocessing may show improved viscosities, viscosity indices, saturates content, low temperature properties, volatilities and depolarization, etc.

Heavy oil upgrade is utilized to convert heavy oils or bitumens into commercially valuable lighter products, e.g., lower boiling hydrocarbons, in one embodiment include liquefied petroleum gas (LPG), gasoline, jet, diesel, vacuum gas oil (VGO), and fuel oils.

In the heavy oil upgrade process, a heavy oil feed is treated or upgraded by contact with a slurry catalyst feed in the presence of hydrogen and converted to lighter products, generating a stream comprising spent finely divided unsupported slurry catalyst, carbon fines, and metal fines in unconverted resid hydrocarbon oil and heavier hydrocracked liquid products (collectively, "heavy oil").

In one embodiment of a heavy oil upgrade process, the process employs a slurry catalyst. Preparation of slurry catalysts suitable for use in the instant invention are disclosed in the following co-pending applications: U.S. Ser. Nos. 10/938,202, 10/938,269, 10/938,200, 10/938,438, and 10/938,003. These applications are incorporated by reference. The co-pending applications mentioned above are also suitable for further information on the hydroconversion processes that may be used in this reactor. Hydroconversion processes include thermal hydrocracking, hydrotreating, hydrodesulfurization, hydrodenitrification and hydrodemetallization.

In one embodiment, the slurry composition is prepared by a series of steps, involving mixing a Group VIB metal oxide, such as molybdenum and aqueous ammonia to form an aqueous mixture, and sulfiding the mixture to form a slurry. The slurry is then promoted with a Group VIII metal. In one embodiment, the catalyst is then mixed with a hydrocarbon oil and combined with hydrogen gas to produce an active slurry catalyst. In one embodiment, the catalyst is kept mixed in storage until combined with feed in a hydroconversion process.

In one embodiment, the catalyst slurry comprising catalyst particles (or particulates) having an average particle size of at least 1 micron in a hydrocarbon oil diluent. In another embodiment, the catalyst slurry comprises catalyst particles having an average particle size in the range of 1-20 microns. In a third embodiment, the catalyst particulates have an average particle size in the range of 2-10 microns. In one embodiment, the slurry catalyst comprises a catalyst having an average particle size ranging from colloidal (nanometer size) to about 1-2 microns. In another embodiment, the slurry catalyst comprises a catalyst having molecules and/or extremely small particles that are colloidal in size (i.e., less than 100 nm, less than about 10 nm, less than about 5 nm, and less than about 1 nm), forming aggregates having an average size ranging from 1 to 10 microns in one embodiment, and 1 to 20 microns in another embodiment, and less than 10 microns in yet a third embodiment.

In one embodiment, the heavy oil feedstock suitable for use in hydroconversion processes of this reactor is selected from the group consisting of atmospheric residuum, vacuum residuum, tar from a solvent deasphalting unit, atmospheric gas oils, vacuum gas oils, deasphalted oils, olefins, oils derived from tar sands or bitumen, oils derived from coal, heavy crude oils, synthetic oils from Fischer-Tropsch processes, and oils derived from recycled wastes and polymers. In the reactor, at least a portion of the heavy oil feedstock (higher boiling point hydrocarbons) is converted to lower boiling hydrocarbons, forming an upgraded product.

In one embodiment of the upgrade of heavy oil feedstock, the mixture or flow in the reactor typically comprises multi-phase components, i.e., all three phases, gas, liquid and solid. In one embodiment, the multi-phase flow mixture comprises gases (e.g., hydrogen and volatile upgraded products), volatile liquid (lower boiling hydrocarbons/lighter hydrocarbon products) as well as non-volatile fractions, which comprises unconverted heavy oil feed, a small amount of heavier hydrocracked liquid products (synthetic or non-volatile upgraded products), the slurry catalyst and any entrained solids (asphaltenes, coke, etc.).

In one embodiment for the upgrade of heavy oil feedstock, a liquid recirculating reactor, e.g., an upflow reactor is employed. In the reactor, heavy hydrocarbon oil feed stock is admixed with a slurry feed comprising a catalyst and a hydrogen-rich gas (herein referred to as hydrogen or hydrogen gas) at elevated pressure and temperature and hydroprocessed (preferably hydrocracked) for the removal of heteroatom contaminants, such as sulfur and nitrogen.

In one embodiment, the reactor condition is controlled to be more or less uniformly across the reactor. In one embodiment, the reactor is maintained under hydrocracking conditions, i.e., at a minimum temperature to effect hydrocracking of a heavy oil feedstock, e.g., a temperature of 410° C. to 482° C., and a pressure from 10 MPa to 25 MPa. In one embodiment, the reactor temperature ranges from about 410° C. (770° F.) to about 600° C. (1112° F.) in one embodiment, less than about 462° C. (900° F.) in another embodiment, more than about 425° C. (797° F.) in another embodiment. In one embodiment, die temperature difference between the inlet and outlet of the reactor ranges from 5 to 50° F. In a second embodiment, from 10 to 40° F.

In one embodiment, the reactor pressure may range from about 10 MPa (1,450 psi) to about 25 MPa (3,625 psi), about 15 MPa (2,175 psi) to about 20 MPa (2,900 psi), less than 22 MPa (3,190 psi), or more than 14 MPa (2,030 psi).

In one embodiment, the liquid hourly space velocity (LHSV) of the heavy oil feed in the reactor will generally range from about 0.025 $h^{-1}$ to about 10 $h^{-1}$ about 0.5 $h^{-1}$ to about 7.5 $h^{-1}$, about 0.1 $h^{-1}$ to about 5 $h^{-1}$, about 0.75 $h^{-1}$ to about 1.5 $h^{-1}$ or about 0.2 $h^{-1}$ to about 10 $h^{-1}$. In some embodiments, LHSV is at least 0.5 $h^{-1}$, at least 1 $h^{-1}$, at least 1.5 $h^{-1}$, or at least 2 $h^{-1}$. In some embodiments, the LHSV ranges from 0.025 to 0.9 h$^{-1}$. In another embodiment, the LHSV ranges from 0.1 to 3 LHSV. In another embodiment, the LHSV is less than 0.5 h$^{-1}$. In yet another embodiment, the LHSV ranges from 3 h$^{-1}$ to about 10 h$^{-1}$.

In one embodiment, the hydrogen gas source is provided to the process at a rate (based on ratio of the gaseous hydrogen source to the crude feed) ranging from 0.1 Nm$^3$/m$^3$ to about 100,000 Nm$^3$/m$^3$ (0.563 to 563,380 SCF/bbl), about 0.5 Nm$^3$/m$^3$ to about 10,000 Nm$^3$/m$^3$ (2.82 to 56,338 SCF/bbl), about 1 Nm$^3$/m$^3$ to about 8,000 Nm$^3$/m$^3$ (5.63 to 45,070 SCF/bbl), about 2 Nm$^3$/m$^3$ to about 5,000 Nm$^3$/m$^3$ (11.27 to 28,169 SCF/bbl), about 5 Nm$^3$/m$^3$ to about 3,000 Nm$^3$/m$^3$ (28.2 to 16,901 SCF/bbl), or about 10 Nm$^3$/m$^3$ to about 800 Nm$^3$/m$^3$ (56.3 to 4,507 SCF/bbl). In one embodiment, the hydrogen gas flow rate ranges from 20,000 to 100,000 Nm$^3$/m$^3$.

In one embodiment, a sufficient amount of hydrogen-containing gas ("hydrogen feed") is introduced for a superficial gas velocity (uG) of at least about 10 cm/sec. In a second embodiment, the hydrogen feed ranges from about 1 to about 15 cm/s. In a third embodiment, at least about 15 cm/s. In a fourth embodiment, in the range of about 2 to about 25 cm/s. In a fifth embodiment, in the range of about 2 to about 40 cm/s.

Figure 2:
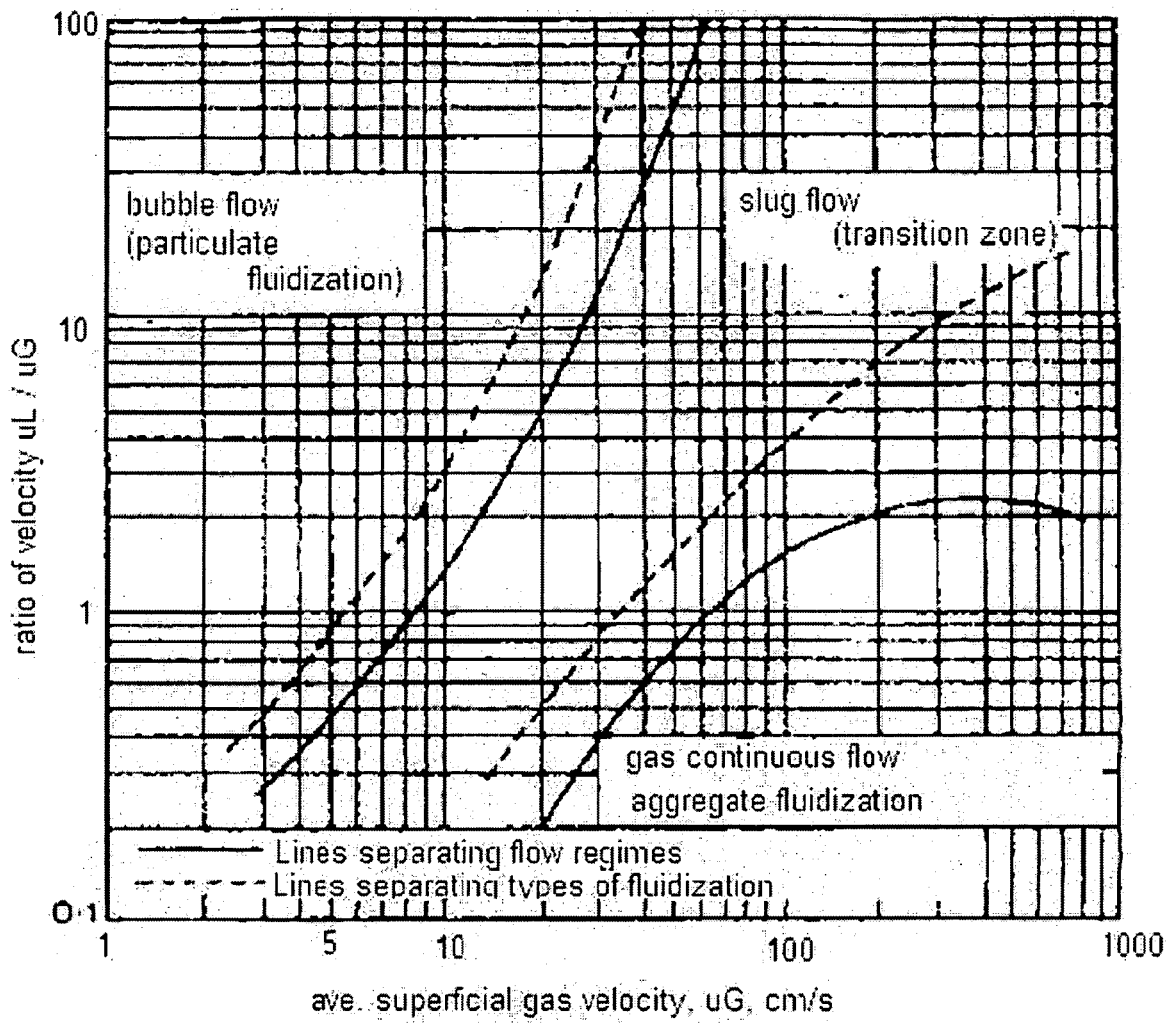
FIG. 2 is a graph depicting a bubble flow region (particulate fluidization) in a fluidizing bed, wherein a high liquid to gas ratio favors bubble flow which is the target flow regime in one embodiment of the invention.

In one embodiment for the upflow reactor to operate in the bubble flow region (particulate fluidization), the liquid recirculation rate throughout the reactor is maintained for a liquid velocity (uL) to gas velocity (uG) ratio of uL/uG corresponding to a bubble flow regime as illustrated in FIG. 2. For example, at a gas velocity rate uG of about 2 cm/s, the liquid recirculation rate is sufficiently maintained for a uL/uG ratio of about > 0.2. At a gas velocity rate uG of about 10 cm/sec, the recirculation rate uL is such that the uL/uG ratio is about > 1.5. At a gas velocity rate uG of about 30 cm/sec, the recirculation rate uL is such that the uL/uG ratio is about >12.

In the prior art for slurry catalyst use, the particles are so small (such as 1-10 micron) that recirculation with a pump is not usually necessary to create sufficient motion of the catalyst to obtain a perfectly mixed flow effect. Therefore, recirculation pumps are typically used with processes employing extrudate catalyst pellets (typically 1 mm in diameter by 2 mm in length).

In one embodiment, the reactor system is characterized as having a recirculation system that would allow a recirculation of a liquid (slurry) flow in the reactor. In one embodiment, the recirculation rate is continuous and sufficiently high for a bubble flow pattern to be maintained, i.e., a uL/uG ratio in the bubble flow regime of FIG. 2. In one embodiment, the recirculation system comprises a pump for recirculating liquid through the reactor. In one embodiment, the pump system recirculates a slurry flow from near the top (outlet) of the reactor back to the bottom (inlet). In another embodiment, the recirculation system comprises appropriate piping, tubing, etc. for conveying liquid from the outlet to the inlet. In one embodiment, instead of or in addition to a pumping apparatus, an upward flow device is employed.

In one embodiment in addition to the recirculation system, the reactor further comprises a mixer in the form of a stirrer, internal baffles, an agitator, or the like, for mixing liquid with substances added thereto (e.g. the substrate, the reagent, solvent, carrier liquid etc.). In another embodiment, the mixer may be disposed within the recirculation system itself, for example in the piping or tubing thereof.

The recirculated slurry stream may comprise unconverted heavy oil feedstock, slurry catalyst, entrained solids, upgraded products and hydrogen-containing gas. In one embodiment, the recirculation rate is at least 3 times the rate of the incoming heavy oil feed stream. In a second embodiment, the recirculation rate ranges from about 5-15 times the rate of the incoming heavy oil feed stream. In a third embodiment, the recirculation rate is at least 7 times the rate of the incoming heavy oil feed stream. In a fourth embodiment, the recirculation rate is at least 5 times the feed stream rate. In a fifth embodiment, the recirculation rate ranges from about 2 to about 5 times the feed stream rate. In a sixth embodiment, the recirculation rate ranges from 5 to 10 times the feed stream rate.

In one embodiment with the use of the slurry catalyst in conjunction with the upflow reactor operating in the dispersed bubble flow regime, the heavy oil conversion rate is at least 90%. In a second embodiment, at least 95% of heavy oil feed is converted to lighter products. In a third embodiment, the conversion rate is at least 98%. In a fourth embodiment, the conversion rate is at least 99%. In a fifth embodiment, the conversion rate is at least 80%. As used herein, conversion rate refers to the conversion of heavy oil feedstock to less than 1000° F. (538° C.) boiling point materials.

Reference will be made to the figures to further illustrate embodiments of the invention.

In FIG. 1, a schematic of an embodiment of a liquid recirculating reactor for use in the upgrade of heavy oil feed stock is depicted. The reactor 12 comprises a cylinder, having a consistent diameter in one embodiment. The lower end of the reactor 12 is closed off with an end piece 17 while the upper end of the reactor 12 is closed off with a roof 18.

A feed line, 24, which is joined by hydrogen feed line 22, leads into the lower end of the reactor 12, below the inlet distributor tray. The feed comprises a mixture of heavy hydrocarbons and a catalyst slurry, along with hydrogen. The reaction occurs as the hydrocarbon and catalyst slurry mix moves upward from the distributor tray. An overhead product withdrawal line 28 leads from the roof 18. Vapor comprising product and hydrogen, admixed with some slurry is passed overhead to separators, while liquid (non-volatile upgraded products) and slurry (asphaltenes, coke, catalyst particles, etc.) is recirculated. Gases are also passed overhead. The liquid product is separated form the catalyst particles either by means of internal separation or by way of external separation. Neither method is shown in this diagram.

A mixing device in the form of a downcomer 34 is located inside the reactor 12. Material not passed overhead is recirculated through the downcomer 34. The downcomer 34 acts to keep the catalyst concentration profile and the temperature profile along the length of the reactor 12 as even as possible, maintaining the bubble flow regime. The downcomer 34 comprises at its upward end a cone 38. The cone 38 contains upcomers which permit gases and liquid to flow upwardly through the cone. The downcomer 34 has an open upper end 42, but the lower end terminates in the inlet of the recirculation pump 21. The outlet of the recirculation pump 21 (not shown) discharges material near the inlet distributor tray 20.

Hydrogen is continuously combined with feed line 24 through the flow line 22. Unreacted hydrogen is withdrawn continuously along the flow line 28. This hydrogen can be recycled (not shown).

The cone 38 of the downcomer 34 permits the bulk of the gas bubbles to escape from fluidized slurry that enters the upper end 42 of the downcomer 34. The downcomer 34 transports the degassed slurry to a lower point in the reactor 12.

FIG. 2 illustrates the flow regimes in a three-phase fluidized bed. Bubble flow (particulate fluidization), slug flow (transition zone) and gas continuous flow (aggregative fluidization) are the three phases depicted. Bubble flow (particulate fluidization), which is the target flow regime, occurs in situations where there is high liquid to gas ratio (left hand side of graph).

In one embodiment, a sufficient amount of hydrogen is introduced to the reactor such that the superficial gas velocity through the reactor is from 2 through 6 cm/s. In this superficial gas velocity range and as illustrated in FIG. 2 and at, bubble flow occurs in the area corresponding to a velocity ratio (liquid to gas) of uL/uG of about or greater than 0.2 for an average superficial gas velocity of 2 cm/sec, and uL/uG of about or greater than 0.6 for an average superficial gas velocity of 6 cm/sec.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

What is claimed is:

1. A process to upgrade a heavy oil feed stock, the process comprising:
    providing the heavy oil feedstock, a slurry catalyst, and a hydrogen containing gas feed having a superficial gas velocity uG,
    providing an upflow reactor having a reactor outlet, a reactor inlet, a recirculation pump for generating a liquid recirculation flow rate (uL) from the reactor outlet to the reactor inlet and at least one internal mixing device selected from the group consisting of a stirrer, internal baffles, agitators, piping, tubing, a downcomer and combinations thereof,
    combining the hydrogen containing gas feed, the heavy oil feedstock, and the slurry catalyst in an upflow reactor under hydrocracking conditions to convert at least a portion of the heavy oil feedstock to lower boiling hydrocarbons, wherein a sufficient uL/uG ratio is maintained for the upflow reactor to operate in a bubble flow regime,
    forming a multi-phase mixture comprising hydrogen admixed with volatile upgraded products, non-volatile upgraded products and the slurry catalyst, the upflow reactor is adapted for providing a liquid recirculation flow rate uL from a reactor outlet to a reactor inlet;
    passing the multi-phase mixture overhead to separators;
    recovering the upgraded products.

2. The process of claim 1, wherein the hydrogen containing gas feed has a superficial gas velocity uG ranging from about 2 to about 40 cm/s.

3. The process of claim 2, wherein the hydrogen containing gas feed has a superficial gas velocity uG ranging from about 2 to about 6 cm/s.

4. The process of claim 3, wherein the ratio uL/uG exceeds about 0.2 when the superficial gas velocity uG is about 2 cm/s.

5. The process of claim 3, wherein the ratio uL/uG exceeds about 0.6 when the superficial gas velocity uG is about 6 cm/s.

6. The process of claim 2, wherein the ratio uL/uG exceeds about 1.5 when the superficial gas velocity uG is about 10 cm/s.

7. The process of claim 2, wherein the ratio uL/uG exceeds about 12 when the superficial gas velocity uG is about 30 cm/s.

8. The process of claim 1, wherein the pump recirculates liquid at a rate ranging from 5-15 times the rate of the heavy oil feed stock.

9. The process of claim 8, wherein the pump recirculates liquid at a rate ranging from 5-10 times the rate of the heavy oil feed stock.

10. The process of claim 1, wherein the pump recirculates liquid at a rate of at least 7 times the rate of the heavy oil feed stock.

11. The process of claim 1, wherein the pump recirculates liquid at a rate ranging from 2-5 times the rate of the heavy oil feed stock.

12. The process of claim 1, wherein the upflow reactor is a liquid recirculating reactor.

13. The process of claim 1, wherein a sufficient amount of hydrogen containing gas feed is provided to the upflow reactor to maintain a liquid hourly space velocity ranging from $0.025\ h^{-1}$ to about $10\ h^{-1}$.

14. The process of claim 1, wherein the hydrogen containing gas feed is provided to the upflow reactor at a rate of about 20,000 to 100,000 $Nm^3/m^3$.

15. The process of claim 1, wherein the heavy oil feed stock is selected from the group of atmospheric residuum, vacuum residuum, tar from a solvent deasphalting unit, atmospheric gas oils, vacuum gas oils, deasphalted oils, olefins, oils derived from tar sands or bitumen, oils derived from coal, heavy crude oils, synthetic oils from Fischer-Tropsch processes, and oils derived from recycled wastes and polymers.

16. The process of claim 1, wherein the catalyst slurry comprises catalyst particles having an average particle size in the range of 1-20 microns.

* * * * *